US009639925B2

(12) United States Patent
Lau et al.

(10) Patent No.: US 9,639,925 B2
(45) Date of Patent: May 2, 2017

(54) DEVICE, SYSTEM, AND METHOD FOR RAPIDLY AND COMPREHENSIVELY INSPECTING LENS ACTUATOR

(71) Applicant: AP PHOTONICS (SHEN ZHEN) LIMITED, Shenzhen (CN)

(72) Inventors: Kam Chiu Lau, Shenzhen (CN); Chi Yuen Lau, Shenzhen (CN); Chen Chao, Shenzhen (CN); Lin Chi Mak, Shenzhen (CN)

(73) Assignee: AP PHOTONICS (SHEN ZHEN) LIMITED, Shenzhen (CN)

( * ) Notice: Subject to any disclaimer, the term of this patent is extended or adjusted under 35 U.S.C. 154(b) by 266 days.

(21) Appl. No.: 14/657,611

(22) Filed: Mar. 13, 2015

(65) Prior Publication Data

US 2015/0187066 A1    Jul. 2, 2015

Related U.S. Application Data

(63) Continuation of application No. PCT/CN2013/081596, filed on Aug. 16, 2013.

(30) Foreign Application Priority Data

Sep. 14, 2012 (CN) .......................... 2012 1 0340581

(51) Int. Cl.
*H04N 5/232* (2006.01)
*G06T 7/00* (2017.01)
(Continued)

(52) U.S. Cl.
CPC ............ *G06T 7/0004* (2013.01); *G01B 11/26* (2013.01); *G02B 5/001* (2013.01); *G02B 7/005* (2013.01);
(Continued)

(58) Field of Classification Search
CPC .......... G02B 7/04; G02B 7/005; G02B 27/62; G02B 5/001; G01B 11/26; H04N 7/18; H04N 5/2254; G06T 7/0004
See application file for complete search history.

(56) References Cited

U.S. PATENT DOCUMENTS

2009/0237517 A1* 9/2009 Lam .................... G03B 5/00
348/208.11

FOREIGN PATENT DOCUMENTS

CN    101231181    7/2008
CN    101251706    8/2008
(Continued)

*Primary Examiner* — Sath V Perungavoor
*Assistant Examiner* — Puneet Dhillon
(74) *Attorney, Agent, or Firm* — Hamre, Schumann, Mueller & Larson, P.C.

(57) ABSTRACT

Disclosed is a device for rapidly and comprehensively inspecting a lens actuator, the device comprising a bracket (4) for fixing the lens actuator, a cone-shaped body (2) and a camera (1), wherein the outer surface of the cone-shaped body (2) is a mirror surface, the cone-shaped body (2) is mounted on the top of the bracket (4), and the camera (1) is hung above the cone-shaped body (2). Further disclosed is a system employing the above-mentioned device for rapidly and comprehensively inspecting a lens actuator, and a method for inspecting a lens actuator by using the above-mentioned device. A rapid inspection can be realized so as to facilitate quality inspection and control in mass production, and a comprehensive inspection also can be realized, the inspection items including lens stroke, magnitude of inclination and the similar items under different control conditions.

8 Claims, 5 Drawing Sheets

(51) Int. Cl.
*G02B 7/00* (2006.01)
*G02B 7/04* (2006.01)
*G02B 5/00* (2006.01)
*G01B 11/26* (2006.01)
*H04N 5/225* (2006.01)
*G02B 27/62* (2006.01)
*H04N 7/18* (2006.01)

(52) U.S. Cl.
CPC ............... *G02B 7/04* (2013.01); *G02B 27/62* (2013.01); *H04N 5/2254* (2013.01); *H04N 7/18* (2013.01)

(56) References Cited

FOREIGN PATENT DOCUMENTS

| | | |
|---|---|---|
| CN | 101645641 | 2/2010 |
| CN | 102375292 | 3/2012 |
| CN | 102829953 | 12/2012 |
| CN | 202903453 | 4/2013 |
| JP | H 11-44522 | 2/1999 |
| JP | 2011-242544 | 12/2011 |

* cited by examiner

DEVICE, SYSTEM, AND METHOD FOR RAPIDLY AND COMPREHENSIVELY INSPECTING LENS ACTUATOR

FIELD OF THE INVENTION

The present invention discloses a device and a method for inspecting lens actuators, and more particularly discloses a device, a system, and a method for rapidly and comprehensively inspecting lens actuators.

BACKGROUND OF THE INVENTION

With gradual development of the digital imaging technology, digital imaging products, such as digital cameras and digital video cameras, are more and more widely used in the people's life, and the digital imaging products include more and more pixels. At present, in most digital products adopting high-pixel camera modules (wherein, a high-pixel camera means a camera including more than two million pixels), the positions of the lenses in the digital camera modules can to be regulated by lens actuators, so that the purposes of automatically focusing and improving the quality of photos or videos are realized. On the other hand, since these high-pixel camera modules are more and more widely used in digital products, the requirement for corresponding lens actuators is continuously enhanced. In the process of mass-production of lens actuators, a rapid and comprehensive method for inspecting the lens actuators and controlling their quality is required. In a comprehensive inspection process for a lens actuator, besides the control relationship between the lens actuator and a lens stroke (i.e., a relative distance between a lens and an image sensor), the inspection items should further include the tilt amplitude inspection for the lens actuator. The reason for which is that: if the tilt amplitude of a lens is too large, though a central portion of an image shot by the lens is focused, a peripheral portion of the image may be out of focus, and the quality of the image may be adversely affected. Furthermore, in numerous lens actuators, a kind of tilt-type optical image stabilization (OIS) voice coil motor (VCM) (for example, US Published Patent Application 20090237517 and CN Patent 200810090504.1) can deliberately change the tilt amplitude of a lens to realize the OIS effect. In this kind of lens actuator, the tilt amplitude of the lens directly affects the OIS effect, and thus the tilt amplitude of the lens becomes more important.

In the prior art, a conventional method for comprehensively inspecting a lens actuator includes: placing a dummy lens into the lens actuator, and measuring the stroke and the tilt amplitude of the dummy lens by different methods. For example, a distance sensor is used to measure the position of the top of the dummy lens from the above of the dummy lens and thereby calculate the stroke of the dummy lens; a reflective film is plated onto the bottom of the dummy lens, laser is transmitted to the reflective film, and the tilt amplitude of the dummy lens is calculated according to the position of reflected laser.

In the conventional inspection method, the dummy lens needs to be inserted into the lens actuator before the lens actuator inspection and removed from the lens actuator after the lens actuator inspection. These operations may cause the following problems:

1. Inserting and removing the dummy lens require additional tools, labor, and time, which increases not only the inspection cost but also the operating cost, and thus the production speed of the lens actuator is reduced;

2. The lens actuator and the dummy lens may be worn when inserting and removing the dummy lens; thus, the production defect rate of the lens actuator may increase, and the inspection cost and the operating cost may indirectly increase;

3. Since the wear of the lens actuator generated in the inspection process may cause that contaminants may be hidden in the lens actuator, when the lens actuator is assembled to a camera module, the hidden contaminants may fall to an image sensor of the camera module; thus, the quality of images shot by the camera module may be adversely affected, and the defect rate of the camera module may increase.

SUMMARY OF THE INVENTION

Aiming at the above-mentioned drawbacks of the traditional lens actuator inspection methods in the prior art, the present invention provides a new device and a new method for rapidly and comprehensively inspecting lens actuators, which adopt a cone-shaped mirror to reflect images in a lens holder of a lens actuator, capture the images by a camera, and thereby calculate the movement situations of the lens actuator.

The present invention solves the above technical problem by adopting the following technical solution: a device for rapidly and comprehensively inspecting a lens actuator, comprising:

a bracket for fixing the lens actuator;
a cone-shaped body; and
a camera;
wherein, the outer surface of the cone-shaped body is a mirror surface, the cone-shaped body is mounted on the top of the bracket, and the camera is hung above the cone-shaped body.

A system adopting the above-mentioned device for rapidly and comprehensively inspecting a lens actuator, wherein, the system includes the inspection device, a control board, and a computer; the computer sends control instruction to the control board and thereby controls the lens actuator to work through the control board; the camera captures the light reflected by the cone-shaped body, and transmits corresponding signals to the computer to perform the inspection process.

A method for using the above-mentioned device for rapidly and comprehensively inspecting a lens actuator comprises the following steps:

A: placing the lens actuator on the bracket, and placing the cone-shaped body inside a lens holder of the lens actuator;

B: using the camera to capture a characteristic image which is in the lens holder and reflected by the cone-shaped body;

C: changing the stroke and/or the tilt angle of the lens holder in the lens actuator;

D: after the stroke and/or the tilt angle of the lens holder is/are changed, using the camera to capture the same characteristic image which is in the lens holder and reflected by the cone-shaped body again;

E: according to the change of the image captured by the camera and corresponding to the characteristic image in the lens holder, performing the following calculation:

$$d_i - e_i = \Delta d_i = k \Delta p_i, i \in [1,4]$$

wherein, $d_i$ is a current distance between the bottom of the lens holder and the bracket, and $e_i$ is a distance between the bottom of the lens holder and the bracket in the case that the stroke and/or the tilt angle of the lens holder is/are not changed; $\Delta p_i$ is the change of the position of the characteristic image in the captured image in the case that the stroke and/or the tilt angle of the lens holder is/are changed relative to the position of the characteristic image in the captured image in the case that the stroke and/or the tilt angle of the lens holder is/are not changed (the measurement unit of $\Delta p_i$ is pixel), and k is a relationship coefficient between pixels and a physical distance of an objective;

F: according to $\Delta d_i$, obtaining the stroke S and the tilt angles $\theta_x$ and $\theta_y$ of the lens holder through the following calculation:

$$S=(\Delta d_i)/4$$

$$\theta_x=\tan^{-1}(d_3-d_4)/a$$

$$\theta_y=\tan^{-1}(d_1-d_2)/a$$

wherein, a is the diameter of the lens holder; $d_1$ is a distance between the highest point of the bottom of the lens holder and the bracket when the lens holder is in a first position, and $d_2$ is a distance between the lowest point of the bottom of the lens holder and the bracket when the lens holder is in the first position; $d_3$ is a distance between the highest point of the bottom of the lens holder and the bracket when the lens holder is in a second position, and $d_4$ is a distance between the lowest point of the bottom of the lens holder and the bracket when the lens holder is in the second position.

The technical solution adopted by the present invention to solve the above technical problem further includes the following contents:

the inclination angle of the bevel of the cone-shaped body allows light in the lens actuator to be reflected into the camera by the bevel;

the inclination angle of the bevel of the cone-shaped body is 45°;

the cone-shaped body is fixedly mounted on a support member, and the support member is fixedly mounted on the bracket;

the cone-shaped body is a circular cone, or a square cone, or a triangular cone;

in the step A, the tip of the cone-shaped body is positioned at a central axis of the lens holder of the lens actuator.

The present invention has the following advantages: the present invention does not need to mount a dummy lens into a lens holder of a lens actuator, but only needs to place the lens actuator on a platform; a cone-shaped mirror is placed at the center of the inner space of the lens holder, but does not contact the lens holder. Therefore, the above-mentioned three problems caused by the use of the dummy lens can be avoided. Compared with the prior art, the present invention can reduce the cost, increase the inspection speed, and improve the production yield rates of lens actuators and camera modules. In the situation that neither a dummy lens nor any other temporary components ("a temporary component" means that the component needs to be removed after inspection) is mounted to a lens actuator, the inspection for the lens actuator can still be realized. The present invention can realize a rapid inspection method so as to facilitate the quality inspection and control in mass production. The present invention can also realize a comprehensive inspection, of which the inspection items include the lens stroke, the tilt amplitude, and the similar items under different control conditions.

The present invention will be further described hereafter with reference to the accompany drawings and embodiments.

Figure 1:
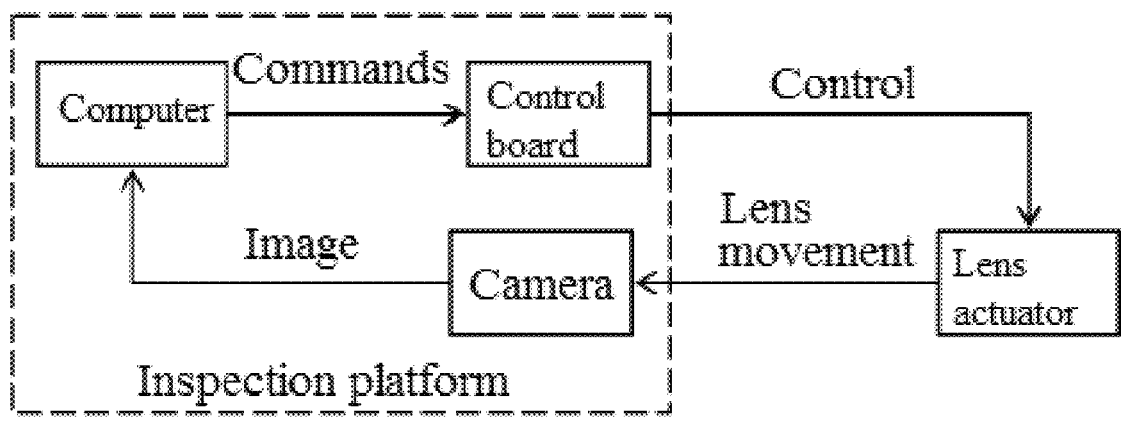
FIG. 1 is a block diagram of a system for rapidly and comprehensively inspecting lens actuators according to an embodiment of the present invention.
Figure 2:
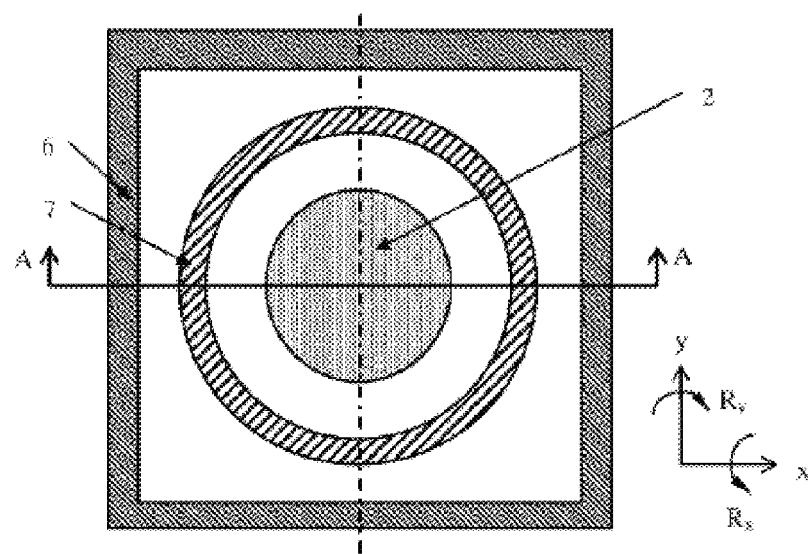
FIG. 2 is a vertical structural schematic view of a device for rapidly and comprehensively inspecting lens actuators according to an embodiment of the present invention.

In the drawings, the corresponding relationship between numbers and components are as follows:

1—camera; 2—cone-haped body; 3—support member; 4—bracket; 5—light path; 6—housing; 7—lens holder; 8—square cone-shaped body; 9—triangular cone-shaped body.

DETAILED DESCRIPTION OF THE PREFERRED EMBODIMENT

The embodiment described hereafter is a preferred embodiment of the present invention, and any other designs including principle and basic structures identical or similar to that of this embodiment should be included in the protection scope of the present invention.

Referring to FIGS. 2-5, a device for rapidly and comprehensively inspecting lens actuators of the present invention mainly includes a bracket 4 configured to fix a lens actuator, a cone-shaped body 2, and a camera 1. Wherein, an outer surface of the cone-shaped body 2 is a mirror surface, which can be used to reflect characteristic images in a lens holder 7 of a lens actuator. In this embodiment, the inclination angle of the bevel of the cone-shaped body 2 (i.e., the outer surface of the cone-shaped body 2) allows light in the lens holder 7 of the lens actuator to be reflected into the camera 1 by the bevel, that is, the camera 1 can capture the light which is in the lens holder 7 and reflected by the cone-shaped body 2, and thus the following calculation work can be facilitated. In this embodiment, the inclination angle of the bevel of the cone-shaped body 2 is preferably 45°. In the present invention, the cone-shaped body 2 can be a square cone-shaped body 8, as the structure shown in FIG. 4; and can also be a triangular cone-shaped body 9, as the structure shown in FIG. 5; furthermore, the cone-shaped body 2 can also be a circular cone or cones having other structures. In this embodiment, the cone-shaped body 2 is fixedly mounted on a support member 3, and the support member 3 is fixedly mounted on the bracket 4. In specific implementation, whether to adopt the support member 3 and the height of the support member 3 can be determined according to the actual requirement. The camera 1 is hung above the cone-shaped body 2 to capture the light reflected by the cone-shaped body 2.

Referring to FIG. 1, the present invention further provides a system adopting the above-mentioned device for rapidly and comprehensively inspecting lens actuators. The system includes a inspection device (i.e., the above-mentioned device for rapidly and comprehensively inspecting lens actuators), a control board, and a computer. The control board is configured to control the work of inspected lens actuators; the computer sends control instruction to the control board, and thereby controls the lens actuators to work (e.g., moving back and forth, tilting the lens holder) through the control board; the camera 1 captures the light reflected by the cone-shaped body 2, and transmits corresponding signals to the computer to perform the inspection process.

Figure 3:
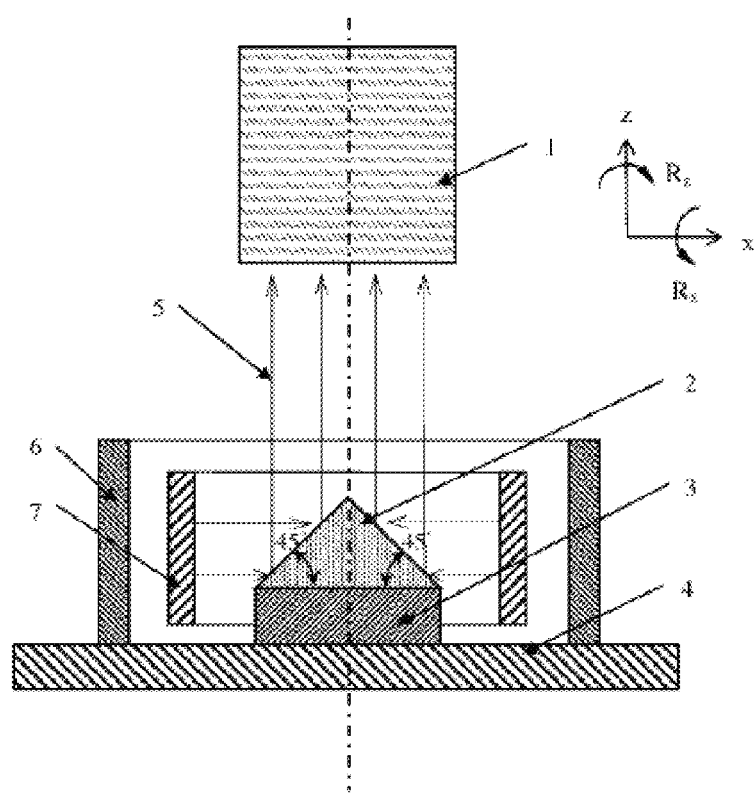
FIG. 3 is a structural schematic view of a cross section of a device for rapidly and comprehensively inspecting lens actuators according to an embodiment of the present invention.
Figure 4:
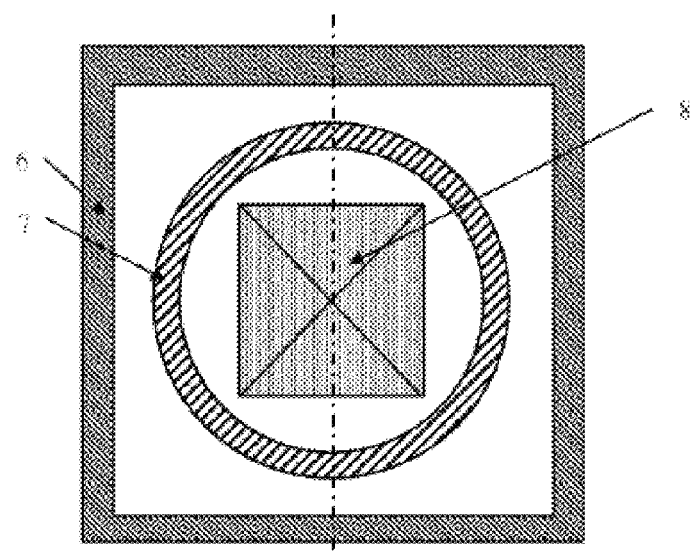
FIG. 4 is a structural schematic view of a device for rapidly and comprehensively inspecting lens actuators according to a first embodiment of the present invention.
Figure 5:
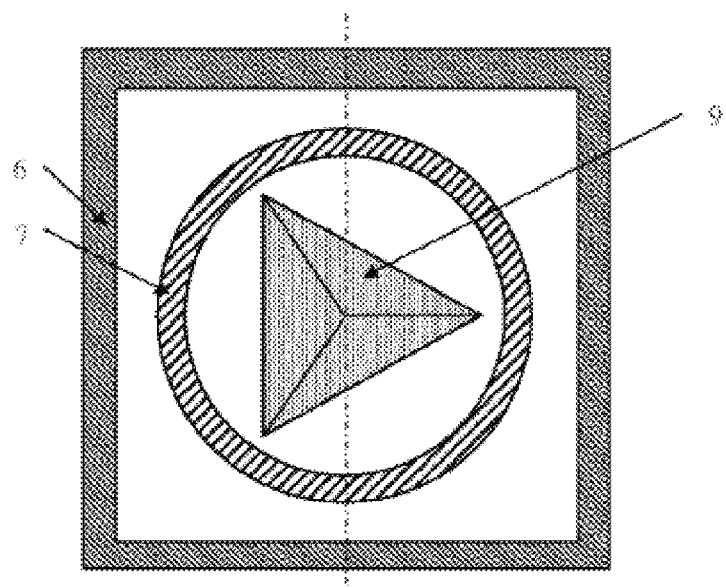
FIG. 5 is a structural schematic view of a device for rapidly and comprehensively inspecting lens actuators according to a second embodiment of the present invention.
Figure 6:
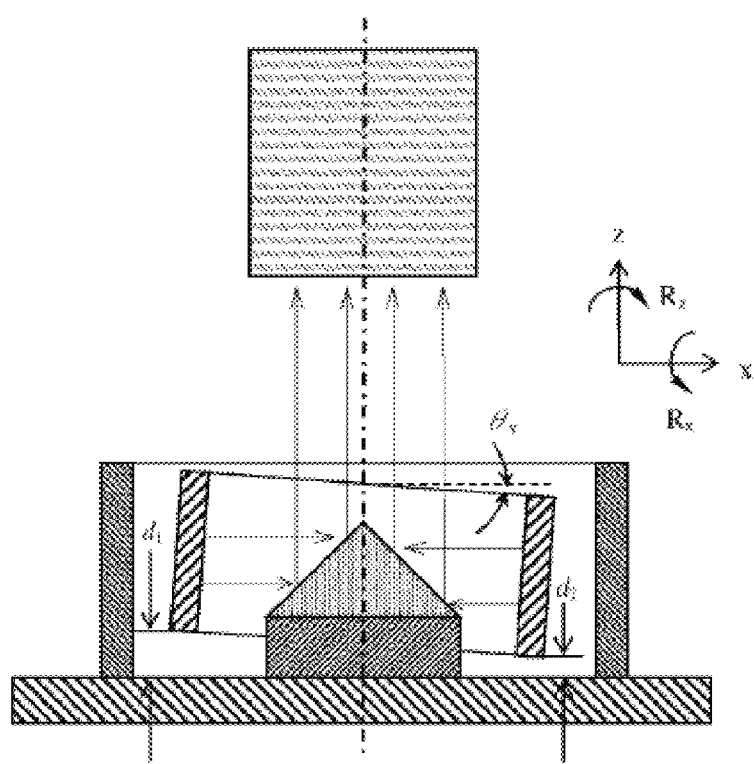
FIG. 6 is a structural schematic view of a first use state of a device for rapidly and comprehensively inspecting lens actuators according to an embodiment of the present invention.
Figure 7:
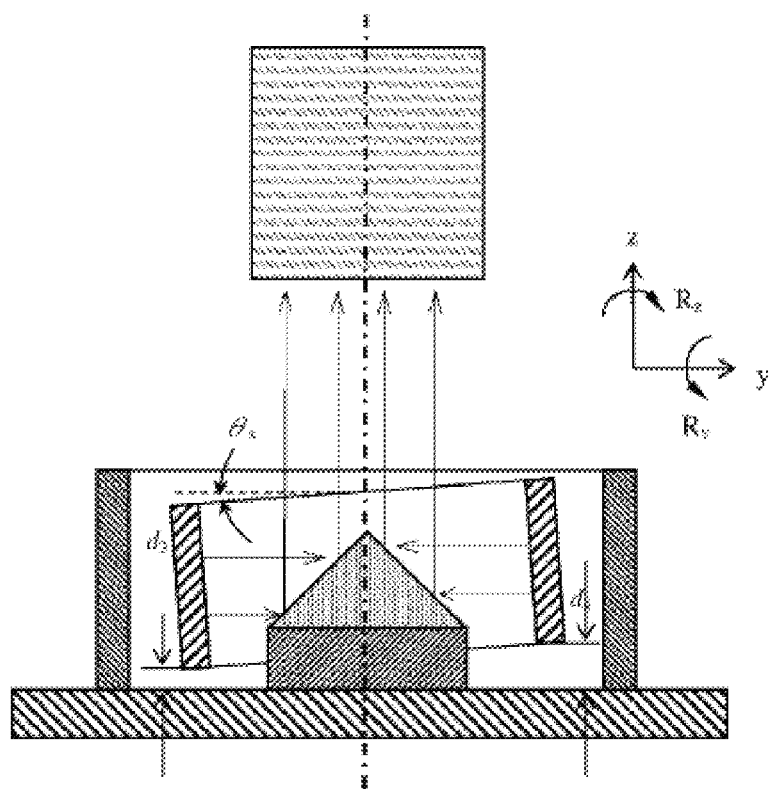
FIG. 7 is a structural schematic view of a second use state of a device for rapidly and comprehensively inspecting lens actuators according to an embodiment of the present invention.
Figure 8:
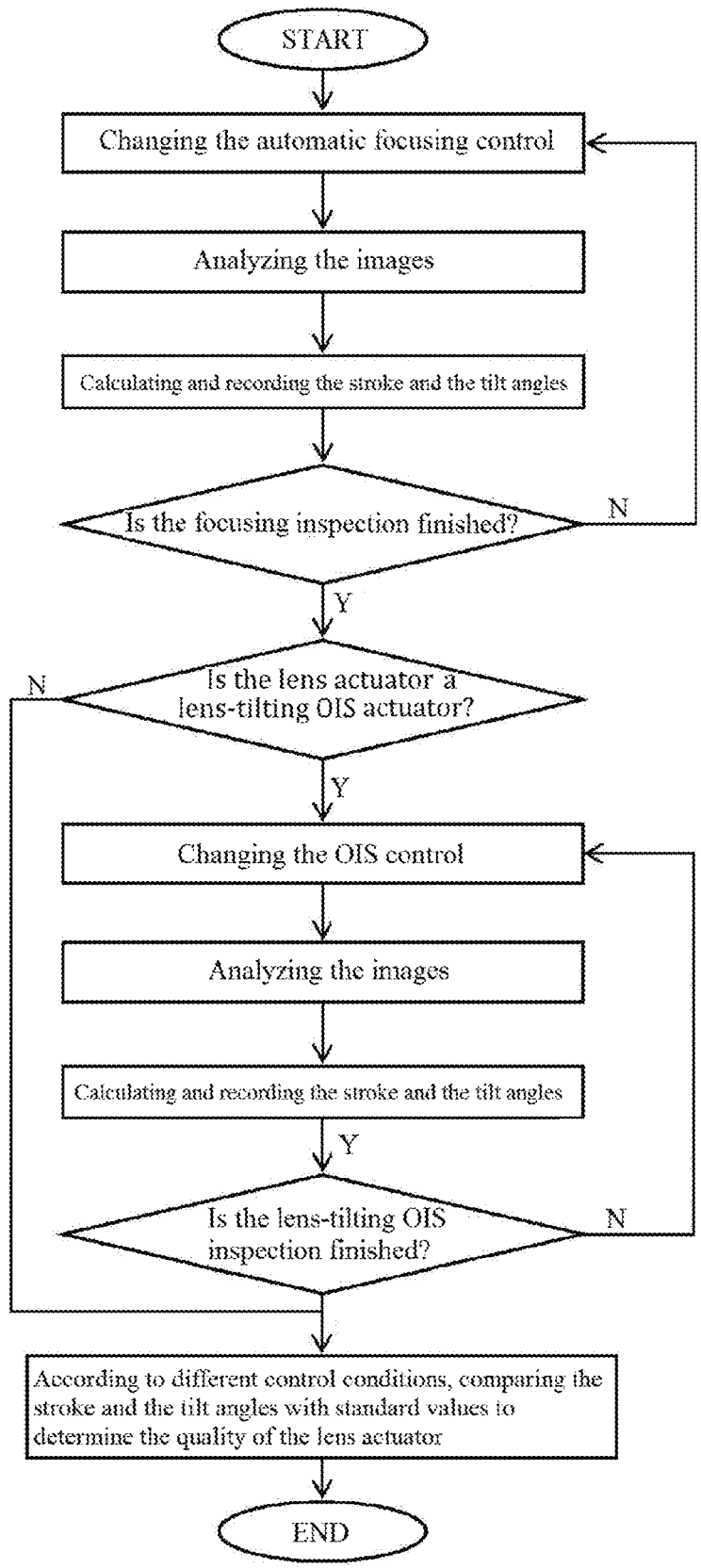
FIG. 8 is a flow chart of a method for rapidly and comprehensively inspecting lens actuators according to an embodiment of the present invention.

Referring to FIG. 8, the present invention further provides a method of using the above-mentioned device for rapidly and comprehensively inspecting lens actuators to inspect lens actuators, which includes the following steps:

A: a lens actuator is placed on the bracket 4, and the cone-shaped body 2 is placed inside a lens holder 7 of the lens actuator (a lens actuator generally comprises two main parts, which include a lens holder 7 and a housing 6, and the lens holder 7 is mounted inside the housing 6); in this embodiment, the tip of the cone-shaped body 2 is preferably positioned at a central axis of the lens holder 7 of the lens actuator, that is, a central axis of the cone-shaped body 2 coincides with the central axis of the lens holder 7;

B: the camera 1 captures a characteristic image (e.g., an image of a screw thread or any other special sign) which is in the lens holder 7 and reflected by the cone-shaped body 2; wherein, the light path can be seen from FIG. 3, FIG. 6, and FIG. 7;

C: the stroke and/or the tilt angle of the lens holder 7 in the lens actuator is/are changed;

D: after the stroke and/or the tilt angle of the lens holder 7 is/are changed, the camera 1 captures the same characteristic image which is in the lens holder 7 and reflected by the cone-shaped body 2 again;

E: according to the change of the image captured by the camera 1 and corresponding to the characteristic image in the lens holder 7, the following calculation can be performed:

$$d_i - e_i = \Delta d_i = k \Delta p_i, \ i \in [1,4]$$

wherein, $d_i$ is a current distance between the bottom of the lens holder 7 and the bracket 4, and $e_i$ is a distance between the bottom of the lens holder 7 and the bracket 4 in the case that the stroke and/or the tilt angle of the lens holder 7 is/are not changed; $\Delta p_i$ is the change of the position of the characteristic image in the captured image in the case that the stroke and/or the tilt angle of the lens holder 7 is/are changed relative to the position of the characteristic image in the captured image in the case that the stroke and/or the tilt angle of the lens holder 7 is/are not changed (the measurement unit of $\Delta p_i$ is pixel), and k is a relationship coefficient between pixels and a physical distance of an objective and can be obtained through experiments; when $\Delta p_i$ becomes larger and larger, it indicates that the characteristic image is getting closer and closer to the center of the captured image;

F: according to $\Delta d_i$, the stroke S and the tilt angles $\theta_x$ and $\theta_y$ of the lens holder 7 can be obtained through calculation; referring to FIG. 6 and FIG. 7:

$$S = (\Delta d_i)/4$$

$$\theta_x = \tan^{-1}(d_3 - d_4)/a$$

$$\theta_y = \tan^{-1}(d_1 - d_2)/a$$

wherein, a is the diameter of the lens holder 7; referring to FIG. 6, $d_1$ is a distance between the highest point of the bottom of the lens holder 7 and the bracket 4 when the lens holder 7 is in a first position, and $d_2$ is a distance between the lowest point of the bottom of the lens holder 7 and the bracket 4 when the lens holder 7 is in the first position; referring to FIG. 7, $d_3$ is a distance between the highest point of the bottom of the lens holder 7 and the bracket 4 when the lens holder 7 is in a second position, and $d_4$ is a distance between the lowest point of the bottom of the lens holder 7 and the bracket 4 when the lens holder 7 is in the second position. According to different control conditions, the stroke and the tilt angles of the lens holder 7 are compared with standard values to determine the quality of the lens actuator.

Compared with the prior art, the present invention can reduce the cost, increase the inspection speed, and improve the production yield rates of lens actuators and camera modules. In the situation that neither a dummy lens nor any other temporary components ("a temporary component" means that the component needs to be removed after inspection) is mounted to a lens actuator, the inspection for the lens actuator can still be realized. The present invention can realize a rapid inspection method so as to facilitate the quality inspection and control in mass production. The present invention can also realize a comprehensive inspection, of which the inspection items include the lens stroke, the tilt amplitude, and the similar items under different control conditions.

What is claimed is:

1. A device for rapidly and comprehensively inspecting a lens actuator, comprising:
    a bracket for fixing the lens actuator;
    a cone-shaped body; and
    a camera;
    wherein, the outer surface of the cone-shaped body is a mirror surface, the cone-shaped body is mounted on the top of the bracket, and the camera is hung above the cone-shaped body.

2. The device for rapidly and comprehensively inspecting a lens actuator according to claim 1, wherein, the inclination angle of the bevel of the cone-shaped body allows light in the lens actuator to be reflected into the camera by the bevel.

3. The device for rapidly and comprehensively inspecting a lens actuator according to claim 2, wherein, the inclination angle of the bevel of the cone-shaped body is 45°.

4. The device for rapidly and comprehensively inspecting a lens actuator according to claim 1, wherein, the cone-shaped body is fixedly mounted on a support member, and the support member is fixedly mounted on the bracket.

5. The device for rapidly and comprehensively inspecting a lens actuator according to claim 1, wherein, the cone-shaped body is a circular cone, or a square cone, or a triangular cone.

6. The system adopting the device for rapidly and comprehensively inspecting a lens actuator of claim 1, wherein, the system includes the inspection device, a control board, and a computer; the computer sends control instruction to the control board and thereby controls the lens actuator to work through the control board; the camera captures the light reflected by the cone-shaped body, and transmits corresponding signals to the computer to perform the inspection process.

7. The method for using the device for rapidly and comprehensively inspecting a lens actuator of claim 1 to inspect a lens actuator, comprising the following steps:

A: placing the lens actuator on the bracket, and placing the cone-shaped body inside a lens holder of the lens actuator;

B: using the camera to capture a characteristic image which is in the lens holder and reflected by the cone-shaped body;

C: changing the stroke and/or the tilt angle of the lens holder in the lens actuator;

D: after the stroke and/or the tilt angle of the lens holder is/are changed, using the camera to capture the same characteristic image which is in the lens holder and reflected by the cone-shaped body again;

E: according to the change of the image captured by the camera and corresponding to the characteristic image in the lens holder, performing the following calculation:

$$d_i - e_i = \Delta d_i = k \Delta p_i, \ i \in [1, 4]$$

wherein, $d_i$ is a current distance between the bottom of the lens holder and the bracket, and $e_i$ is a distance between the bottom of the lens holder and the bracket in the case that the stroke and/or the tilt angle of the lens holder is/are not changed; $\Delta p_i$ is the change of the position of the characteristic image in the captured image in the case that the stroke and/or the tilt angle of the lens holder is/are changed relative to the position of the characteristic image in the captured image in the case that the stroke and/or the tilt angle of the lens holder is/are not changed (the measurement unit of $\Delta p_i$ is pixel), and k is a relationship coefficient between pixels and a physical distance of an objective;

F: according to $\Delta d_i$, obtaining the stroke S and the tilt angles $\theta_x$ and $\theta_y$ of the lens holder through the following calculation:

$$S = (\Delta d_i)/4$$

$$\theta_x = \tan^{-1}(d_3 - d_4)/a$$

$$\theta_y = \tan^{-1}(d_1 - d_2)/a$$

wherein, a is the diameter of the lens holder; $d_1$ is a distance between the highest point of the bottom of the lens holder and the bracket when the lens holder is in a first position, and $d_2$ is a distance between the lowest point of the bottom of the lens holder and the bracket when the lens holder is in the first position; $d_3$ is a distance between the highest point of the bottom of the lens holder and the bracket when the lens holder is in a second position, and $d_4$ is a distance between the lowest point of the bottom of the lens holder and the bracket when the lens holder is in the second position.

8. The method according to claim 7, wherein, in the step A, the tip of the cone-shaped body is positioned at a central axis of the lens holder of the lens actuator.

* * * * *